(12) United States Patent
Collins

(10) Patent No.: US 8,601,825 B2
(45) Date of Patent: Dec. 10, 2013

(54) INTEGRATED ABSORPTION REFRIGERATION AND DEHUMIDIFICATION SYSTEM

(75) Inventor: James C. Collins, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 1162 days.

(21) Appl. No.: 12/117,068

(22) Filed: May 8, 2008

(65) Prior Publication Data

US 2008/0282702 A1 Nov. 20, 2008

Related U.S. Application Data

(60) Provisional application No. 60/938,049, filed on May 15, 2007.

(51) Int. Cl.
*F25D 17/06* (2006.01)

(52) U.S. Cl.
USPC .......... 62/93; 62/94; 60/39.511; 60/728

(58) Field of Classification Search
USPC .......... 60/39.511, 266, 782, 784, 785, 806; 62/93, 94, 271, 506; 165/144
See application file for complete search history.

(56) References Cited

U.S. PATENT DOCUMENTS

| | | | |
|---|---|---|---|
| RE10,725 E | 5/1886 | Hendrick | |
| 3,739,594 A | 6/1973 | Freese | |
| 4,337,625 A | 7/1982 | Wilkinson | |
| 4,413,479 A | 11/1983 | Rojey | |
| 4,819,446 A | 4/1989 | Moore | |
| 5,916,252 A | 6/1999 | Yoshida et al. | |
| 6,050,082 A * | 4/2000 | Leonard et al. | 60/791 |
| 6,073,454 A | 6/2000 | Spauschus et al. | |
| 6,101,832 A | 8/2000 | Franz et al. | |
| 6,811,762 B2 * | 11/2004 | Moore | 423/359 |
| 6,931,876 B2 | 8/2005 | von Gutfeld | |
| 6,984,258 B2 | 1/2006 | Niclout et al. | |
| 8,006,503 B2 * | 8/2011 | Collins et al. | 62/93 |
| 2004/0035117 A1 * | 2/2004 | Rosen | 60/772 |

FOREIGN PATENT DOCUMENTS

| | | |
|---|---|---|
| EP | 1882889 A2 | 1/2008 |
| EP | 1884548 A2 | 2/2008 |

* cited by examiner

*Primary Examiner* — Ehud Gartenberg
*Assistant Examiner* — Arun Goyal
(74) *Attorney, Agent, or Firm* — Michael Best & Friedrich LLP

(57) ABSTRACT

An integrated absorption refrigeration and dehumidification system includes an absorber containing an absorption solution, an after-cooler having a flow path to receive the solution and a flow path to receive a warm fluid, the flow paths being thermally coupled to separate a refrigerant from the solution, and an auxiliary heat exchanger having a flow path to receive the solution from the after-cooler and a flow path to receive a warm fluid, the flow paths being thermally coupled to separate more refrigerant from the solution. The system also includes a condenser positioned to receive and cool the refrigerant from the auxiliary heater, an expansion valve positioned to receive the refrigerant from the condenser, an evaporator positioned to receive the refrigerant from the expansion valve and the warm fluid from the after-cooler, and a separator to remove condensate from the warm fluid from the after-cooler or a cool fluid from the evaporator.

7 Claims, 4 Drawing Sheets

INTEGRATED ABSORPTION REFRIGERATION AND DEHUMIDIFICATION SYSTEM

CROSS-REFERENCE TO RELATED APPLICATIONS

This application claims priority to U.S. Provisional Patent Application No. 60/938,049, filed May 15, 2007, the entire contents of which are hereby incorporated by reference.

BACKGROUND

The present invention relates to an absorption refrigeration system. More specifically, the invention relates to an integrated absorption refrigeration and dehumidification system.

Absorption refrigeration systems follow a vapor compression cycle similar to classical refrigeration cycles. However, in an absorption refrigeration system, a refrigerant compressor typically found in a classical refrigeration cycle is replaced by a thermally-activated absorption process that requires additional thermal energy. The thermal energy separates a refrigerant from a secondary solution, making the refrigerant suitable for cooling.

SUMMARY

In one embodiment, the invention provides an integrated absorption refrigeration and dehumidification system including an absorber containing an absorption solution that is a mixture of a refrigerant and a secondary solution and an after-cooler having a first flow path to receive the absorption solution from the absorber and a second flow path to receive a first warm fluid. The first and second flow paths are thermally coupled such that the first warm fluid heats the absorption solution to separate a first portion of refrigerant from the absorption solution. The system also includes an auxiliary heat exchanger separate from the after-cooler and having a third flow path to receive the absorption solution from the after-cooler and a fourth flow path to receive a second warm fluid. The third and fourth flow paths are thermally coupled such that the second warm fluid heats the absorption solution to separate a second portion of refrigerant from the absorption solution. The system further includes a condenser positioned to receive the first portion of refrigerant and the second portion of refrigerant from the auxiliary heater and cool the refrigerant, an expansion valve positioned to receive the refrigerant from the condenser, and an evaporator positioned to receive a cool refrigerant from the expansion valve and the first warm fluid from the after-cooler. The evaporator is configured to cool the first warm fluid with the cool refrigerant. The system also includes a separator positioned to remove condensate from at least one of the first warm fluid from the after-cooler and a cool fluid from the evaporator.

In another embodiment, the invention provides a dehumidification system for use with an absorption refrigeration system. The absorption refrigeration system is operable to cool a refrigerant in an absorption solution. The dehumidification system includes an after-cooler operable to receive a warm fluid. The after-cooler is configured to be in communication with a portion of the absorption refrigeration system to heat the absorption solution with the warm fluid to separate the refrigerant from a secondary solution and cool the warm fluid. The system also includes a first separator positioned to receive the warm fluid from the after-cooler and remove condensate from the warm fluid, and an evaporator positioned to receive the warm fluid from the first separator. The evaporator is configured to be in communication with a portion of the absorption refrigeration system to cool the warm fluid with the refrigerant. The system further includes a second separator separate from the first separator and positioned to receive a cool fluid from the evaporator and remove condensate from the cool fluid.

In yet another embodiment, the invention provides a system including a microturbine engine having a compressor operable to compress air, a recuperator positioned to receive compressed air from the compressor and preheat the compressed air, and a combustor positioned to receive the compressed air from the recuperator. The combustor is operable to combust a mixture of the compressed air and a compressed fuel to produce a flow of products of combustion. The microturbine engine also includes a turbine driven by the flow of products of combustion and an electrical generator coupled to the turbine. The electrical generator is driven by the turbine to output electrical power. The system also includes an integrated absorption refrigeration and dehumidification system operable to cool and dehumidify the compressed fuel and having an absorber containing an absorption solution that is a mixture of a refrigerant and a secondary solution, and an after-cooler including a first flow path to receive the absorption solution from the absorber and a second flow path to receive a warm compressed fuel. The first and second flow paths are thermally coupled such that the warm compressed fuel heats the absorption solution to separate the refrigerant from the absorption solution. The integrated absorption refrigeration and dehumidification system also includes a condenser positioned to receive the refrigerant from the after-cooler and cool the refrigerant, an expansion valve positioned to receive the refrigerant from the condenser, and an evaporator positioned to receive a cool refrigerant from the expansion valve and the warm compressed fuel from the after-cooler. The evaporator is configured to cool the warm compressed fuel with the cool refrigerant. The integrated absorption refrigeration and dehumidification system further includes a separator positioned to remove condensate from the compressed fuel before the compressed fuel flows into the combustor of the microturbine engine.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
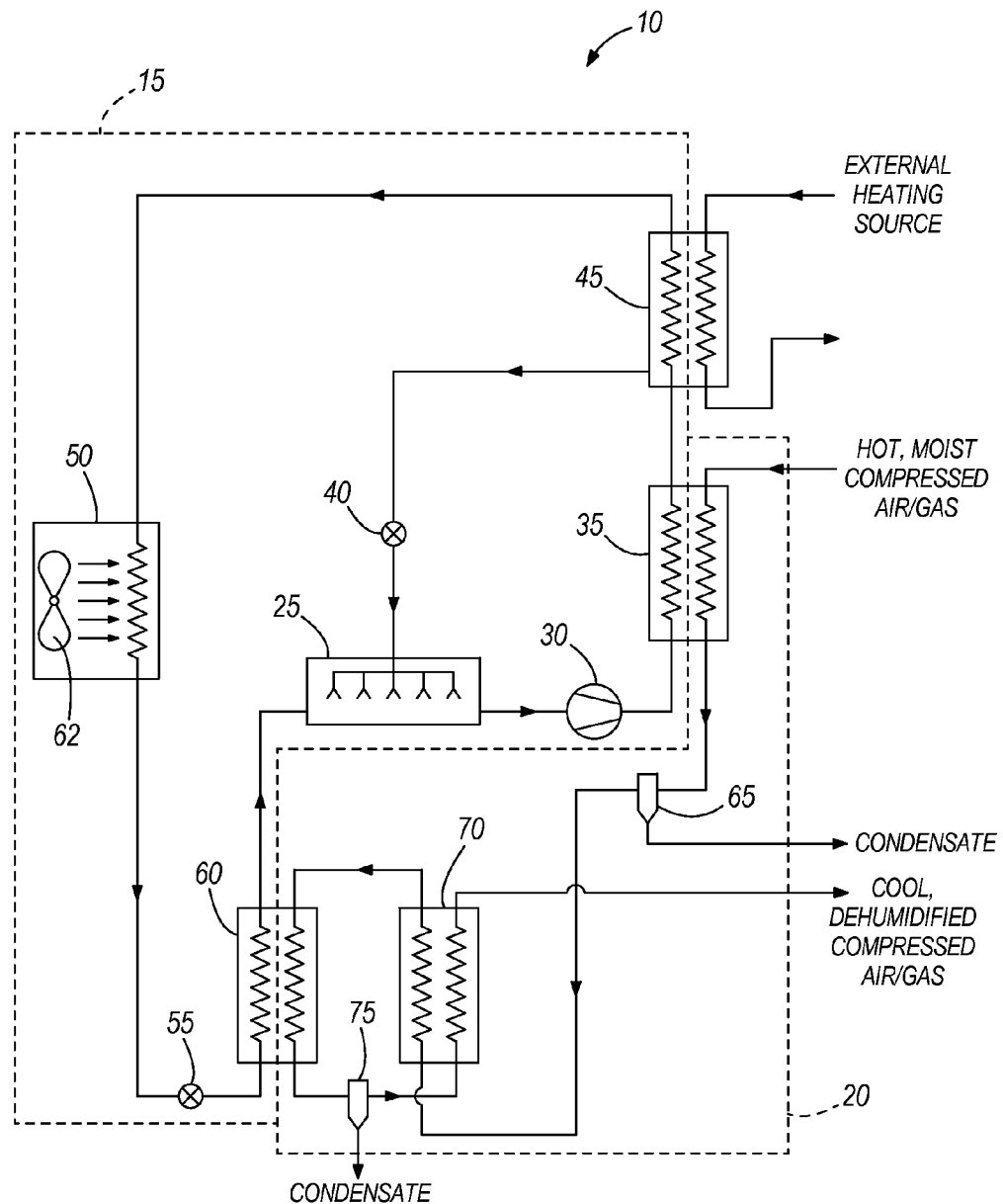
FIG. 1 is a schematic illustration of an integrated absorption refrigeration and dehumidification system embodying the invention.

FIG. 1 is a schematic of an integrated absorption refrigeration and dehumidification system 10. The system 10 is termed "integrated" in that a single system includes both an absorption refrigeration system 15 and a dehumidification system 20. Generally, refrigerant in the absorption refrigeration system 15 acts on a compressed fluid in the dehumidification system 20 to remove heat from and condense water vapor in the compressed fluid. In turn, the compressed fluid in the dehumidification system 20 acts on an absorption solution in the absorption refrigeration cycle to separate the refrigerant from a secondary solution.

In the construction illustrated in FIG. 1, the absorption refrigeration system 15 includes an absorber 25, a pump 30, an after-cooler or generator 35, a control valve 40, an auxiliary heater 45, a condenser 50, an expansion valve 55, and an evaporator 60. An absorption solution flows through the absorption refrigeration system 15 to provide cooling for compressed air. The absorption solution includes a soluble substance, or refrigerant, such as ammonia and a secondary solution, or absorber, such as water. In other constructions, different refrigerants and/or secondary fluids may be used to form a suitable absorption solution.

The pump 30 is positioned downstream from the absorber 25 and draws the absorption solution from the absorber 25. In some constructions, the pump 30 may be a mechanical vacuum pump suitable to create a driving pressure. In other constructions, the pump 30 may be a lightweight gas such as, for example, hydrogen that can be heated to create a driving pressure. The gas expands as it is heated, creating the driving pressure to push the absorption solution through the refrigeration system 15.

The after-cooler 35 and the auxiliary heater 45 are positioned downstream of the pump 30 and heat the absorption solution to facilitate separation of the refrigerant from the secondary solution. The after-cooler 35 and the auxiliary heater 45 may be any type of suitable heat exchanger such as, but not limited to, parallel-flow or counter-flow heat exchangers. In some constructions, the auxiliary heater 45 may be omitted or may only be used when the absorption solution is not sufficiently heated by the after-cooler 35.

The control valve 40 is a high-to-low pressure device positioned between the auxiliary heater 45 and the absorber 25. The control valve 40 reduces the pressure of fluid flowing from the auxiliary heater 45 to the absorber 25. In the illustrated construction, the control valve 40 reduces the pressure of the secondary solution after the refrigerant boils away in the auxiliary heater 45. In some constructions, the control valve 40 may be, for example, a ball valve, needle valve, check valve, or the like. As the absorption solution separates, the refrigerant vapor flows to the condenser 50 while the liquid secondary solution is directed toward the absorber 25.

The condenser 50 is positioned between the auxiliary heater 45 and the expansion valve 55 to cool the refrigerant to a suitable temperature. The condenser 50 may be, for example, an air-cooled condenser or a water-cooled condenser. In the illustrated construction, the condenser 50 is air-cooled and includes a fan 62 to propel air over a condenser coil, thereby cooling and condensing refrigerant within the coil.

The expansion valve 55 is positioned between the condenser 50 and the evaporator 60. The expansion valve 55 controls the rate at which liquid refrigerant can flow toward the evaporator 60. As the liquid refrigerant passes through the expansion valve 55, the liquid refrigerant expands, thereby reducing the temperature of the refrigerant.

The evaporator 60 is positioned between the expansion valve 55 and the absorber 25. The evaporator 60 includes a hot side and a cold side in a heat exchange relationship with each other such that heat from a fluid passing through the hot side may transfer to fluid passing through the cold side. For example, similar to the after-cooler 35 and the auxiliary heater 45, the evaporator 60 may be, but is not limited to, a parallel-flow or counter-flow heat exchanger. In the illustrated construction, the refrigerant from the expansion valve 55 passes through the cold side of the evaporator 60, while compressed air passes through the hot side.

In the construction illustrated in FIG. 1, the dehumidification system 20 includes the after-cooler 35, a first separator 65, a recuperator 70, the evaporator 60, and a second separator 75. Humid, compressed fluid (e.g., air) flows through the dehumidification system 20 in order to remove water and/or heat from the compressed fluid. The compressed fluid passes through the after-cooler 35 to cool, flows through the first separator 65 to remove condensate, and passes through the recuperator 70 and the evaporator 60 to further cool. In addition, the compressed fluid flows through the second separator 75 to remove more condensate and passes through the recuperator 70 a second time to facilitate cooling of the compressed fluid passing through the recuperator 70 the first time. In some constructions, the compressed fluid may be generated by a compressor such as, for example, a centrifugal compressor, a screw compressor, a reciprocating compressor, or the like.

The first and second separators 65, 75 are positioned to remove condensate from the compressed fluid. The separators 65, 75 may be any type of suitable condensate separator such as, for example, a gravity separator, a filter separator, a centrifugal separator, or the like. In the illustrated construction, the separators 65, 75 separate and remove condensed water from compressed air in order to dehumidify the compressed air. In other constructions, the separators 65, 75 may be configured to remove other fluids (e.g., oil, lubricants, etc.) from the compressed air.

In operation of the absorption refrigeration system 15, an absorption solution is drawn from the absorber 25 by the pump 30 and directed through the after-cooler 35 where heat is transferred from the hot compressed air to the absorption solution. In the illustrated construction, the absorption solution also passes through the auxiliary heater 45 which is heated by an external heat source to further heat the absorption solution. As the absorption solution heats up, the refrigerant boils away from the secondary solution, leaving a weak liquid solution (e.g., a solution composed mostly of the secondary solution) and pure refrigerant vapor (e.g., refrigerant with little or no secondary solution).

The vaporized refrigerant flows from the auxiliary heater 45 to the condenser 50 where it is cooled and condensed to become a liquid. Liquid refrigerant leaves the condenser 50 and passes through the expansion valve 55 where the refrigerant rapidly expands, thereby producing a pressure drop and a temperature drop. The cool, low pressure refrigerant then flows to the evaporator 60 where it absorbs heat and vaporizes. The vaporized refrigerant then returns to the absorber 25 to complete the cycle.

Meanwhile, the weak solution flows through the control valve 40 back to the absorber 25. In the absorber 25, the weak solution mixes with the refrigerant, causing the weak solution to absorb the refrigerant and recreate the absorption solution. The absorption solution is drawn from the absorber 25 by the pump 30, increasing the pressure of the absorption solution and directing the absorption solution back toward the after-cooler 35 to begin the cycle again.

In operation of the dehumidification system 20, hot, moist compressed air from a compressor flows through the after-cooler 35 to exchange heat with the absorption solution, as discussed above. Exchanging heat with the absorption solution cools the compressed air and causes some water vapor to condense. The first separator 65 separates and removes the condensate from the compressed air.

The compressed air then passes through a hot side of the recuperator 70 and is cooled by compressed air leaving the evaporator 60.

Next, the compressed air passes through the evaporator 60 and is cooled by the vaporized refrigerant. In the evaporator 60, more water vapor may condense as the compressed air cools. The second separator 75 separates and removes the additional condensate from the compressed air.

The compressed air then passes through a cold side of the recuperator 70 where it is heated by the compressed air passing through the hot side. In the recuperator 70, the compressed air passing through the cold side is warmed to a temperature above its dewpoint, thereby decreasing its relative humidity. Cool, dehumidified compressed air flows out of the dehumidification system 20 for use by a downstream air tool, system, or process. Removing water from the compressed air to reduce the relative humidity of the compressed air reduces corrosion formation and contamination of the downstream air system that receives and uses the compressed air.

Figure 2:
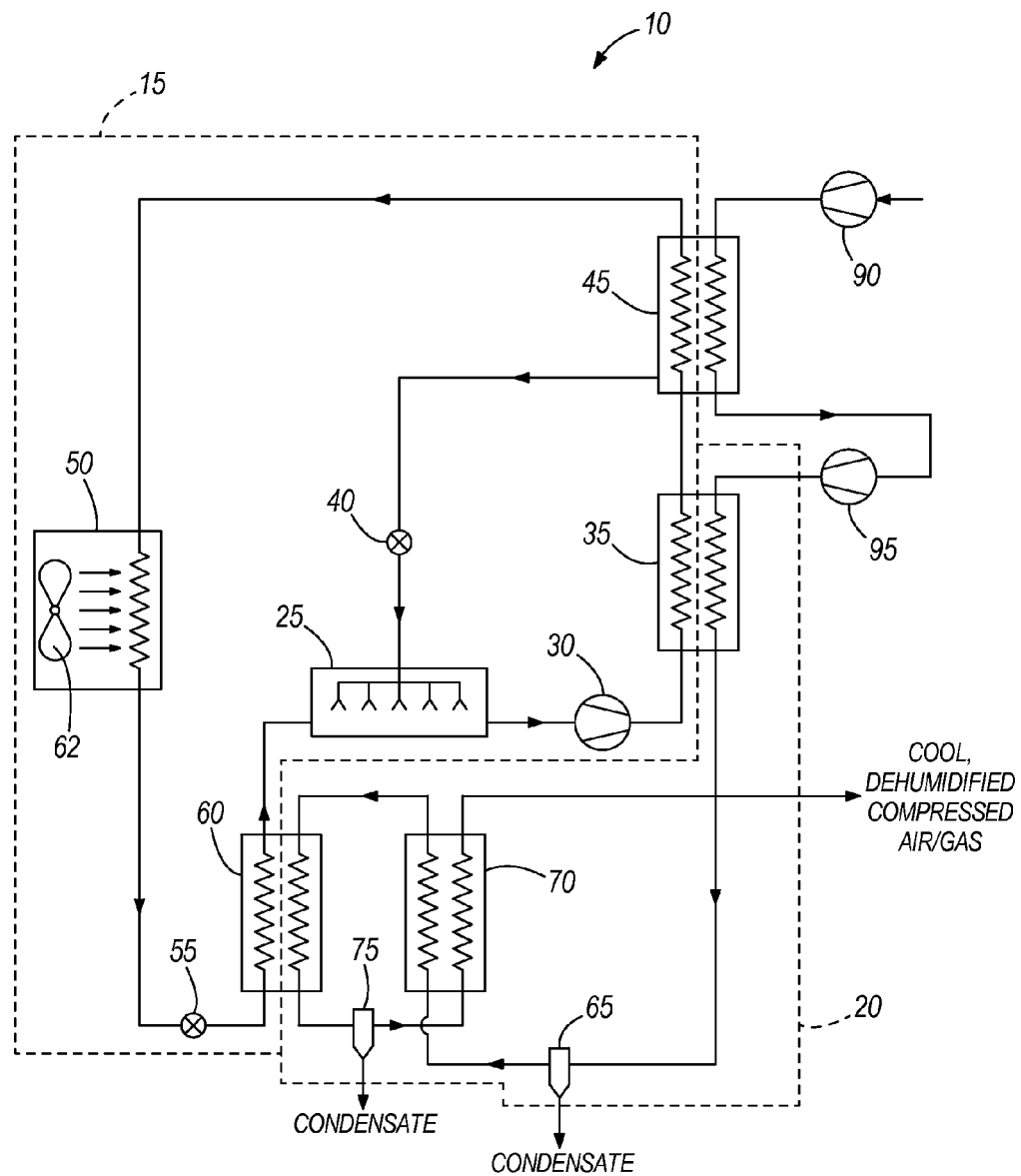
FIG. 2 is a schematic illustration of the integrated absorption refrigeration and dehumidification system of FIG. 1 including a multi-stage compressor.

FIG. 2 illustrates the integrated absorption refrigeration and dehumidification system 10 shown in FIG. 1, where the external heating source is provided by a multi-stage compressor. For example, as shown in the construction illustrated in FIG. 2, the auxiliary heater 45 is positioned between a first compression stage 90 and a second compression stage 95, and the after-cooler 35 is positioned after the second compression stage 95.

In operation, compressed fluid from the first stage 90 passes through the auxiliary heater 45, and is then directed to the second stage 95 for further compression. The further compressed fluid from the second stage 95 is driven through the dehumidification system 20 in the manner described above with reference to FIG. 1. This arrangement improves the efficiency of both the compressor system and the absorption refrigeration system 10.

Figure 3:
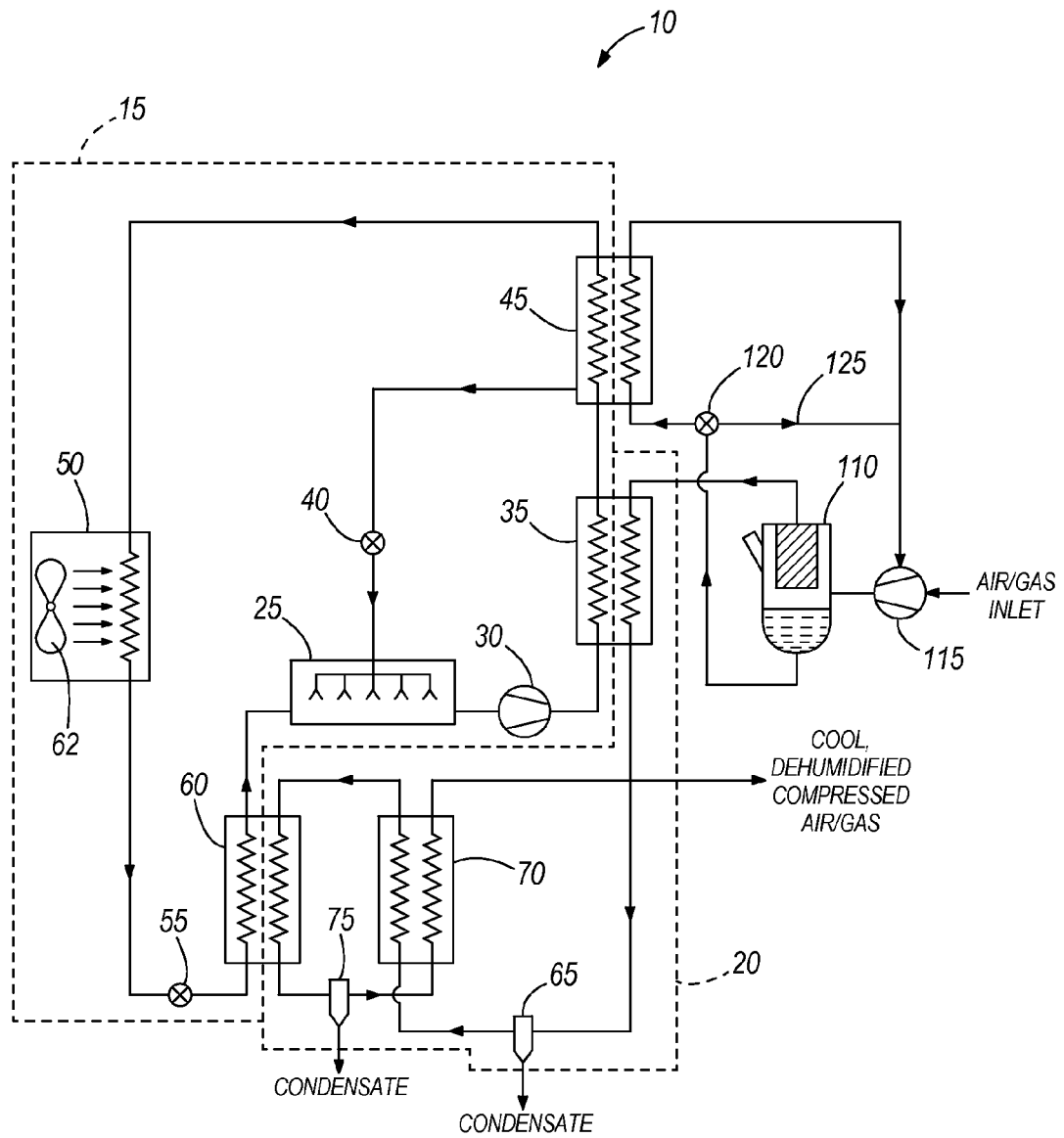
FIG. 3 is a schematic illustration of the integrated absorption refrigeration and dehumidification system of FIG. 1 including an oil separator.

FIG. 3 illustrates the integrated absorption refrigeration and dehumidification system 10 shown in FIG. 1, where the external heating source is provided by hot oil. For example, as shown in the construction illustrated in FIG. 3, the auxiliary heater 45 is in communication with an air/oil separator 110. In one arrangement, compressed air and oil from a compressor 115 (e.g., an oil-flooded rotary screw compressor) enter the separator 110 and undergo a cyclonic motion within the separator 110. As the compressed air and the oil are whirled around an inner surface of the separator 110, the heavy oil is forced outward and slides down the inner surface to collect in the bottom of the separator 110, thereby separating the compressed air and the oil. In other arrangements, the air/oil separator 110 may include other separating devices such as multi-chamber separators, coalescing filters, or the like.

The oil is then directed through a thermostatic oil control valve 120 which allows oil above a predetermined temperature to pass to the auxiliary heater 45 and supplement heating of the absorption solution. Cooler oil is directed through a bypass 125 and back toward the compressor 115.

Figure 4:
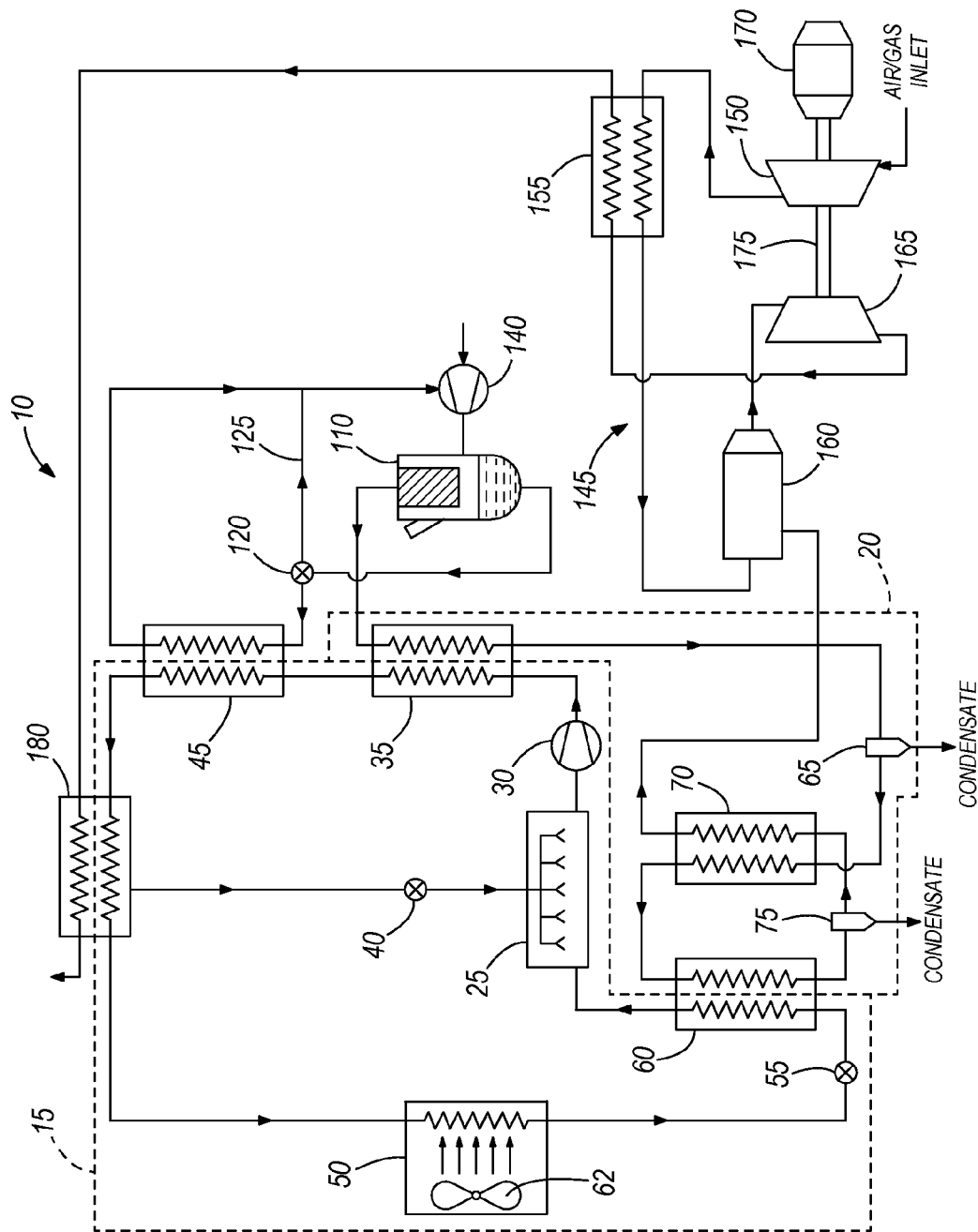
FIG. 4 is a schematic illustration of the integrated absorption refrigeration and dehumidification system of FIG. 1 including a microturbine engine.

FIG. 4 illustrates the integrated absorption refrigeration and dehumidification system 10 shown in FIG. 3, where the hot oil is provided by a fuel or gas booster 140 for a microturbine engine 145. Also, rather than drying compressed air, the dehumidification system 20 is employed to dry compressed fuel for use in the microturbine engine 145. The illustrated microturbine engine includes a compressor 150, a recuperator 155, a combustor 160, a turbine 165, and an electrical generator 170.

The fuel booster compressor 140 compresses fuel (e.g., natural gas, methane, VOCs, or other low-pressure fuels) prior to combustion in the combustor 160. In the illustrated construction, the fuel booster compressor 140 delivers a mixture of compressed fuel and oil to the gas/oil separator 110. The gas/oil separator 110 separates the compressed fuel from the oil and directs the oil toward the oil cooler 120. The compressed fuel is directed through the after-cooler 35, the separators 65, 75, the evaporator 60, and the recuperator 70 to remove moisture and/or polysiloxanes from the compressed fuel.

In operation of the microturbine engine 145, air is compressed in the compressor 150 and delivered to a cool side of the recuperator 155. The recuperator 155 may be, for example, a counterflow plate-fin type heat exchanger. The compressed air is preheated within the recuperator 155 and mixed with the fuel from the fuel booster compressor 140 to create a combustible mixture. The combustible mixture is combusted in the combustor 160 and permitted to expand through the turbine 165, imparting rotational energy to the turbine 165. Rotation of the turbine 165 drives operation of the compressor 150 and the electrical generator 170 to produce electrical power at a useful frequency. In some embodiments, power electronics or a gearbox may be used to condition the electrical power into a useful frequency.

In the illustrated microturbine engine 145, the turbine 165 and the compressor 150 are coupled for rotation together via a shaft 175. Thus, rotation of the turbine 165 also drives rotation of the compressor 150. In other embodiments, the turbine 165 may only drive the electrical generator 170, and an additional gasifier turbine may be used to drive the compressor 150. In such embodiments, the air is expanded through both the turbine 165 and the gasifier turbine. Prior to being exhausted from the microturbine engine 145, the air flows into a hot side of the recuperator 155 to preheat the inflowing compressed air. In addition, the gas or air flows through a waste heat generator, or auxiliary heater, 180 positioned downstream of the auxiliary heater 45 to heat the absorption solution of the refrigeration system 15, thereby supplementing the heat provided by the after-cooler 35 and the auxiliary heater 45.

Removing moisture and polysiloxanes from the compressed fuel helps reduce unwanted flame suppression (i.e., flame-out) and helps reduce the formation of corrosive elements that can form during combustion such as, for example, an aqueous solution of $H_2S$. In addition, condensing and removing polysiloxanes found in some fuel sources (e.g., waste gas) helps reduce sand formations in the combustor 160 during the combustion process.

Integrated absorption refrigeration and dehumidification systems 10 utilize otherwise wasted heat energy from a compressor or a fuel booster to power a significant portion of the absorption refrigeration system 15, thereby improving the overall system efficiency. In addition, integrating the absorption refrigeration system 15 with the dehumidification system 20 reduces the physical size and cost of the inter-stage coolers (e.g., the after-cooler 35, the auxiliary heater 45, and the evaporator 60). Using the recuperator 70 also reduces the need for a larger refrigeration circuit and improves the overall system efficiency.

Thus, the invention provides, among other things, an integrated absorption refrigeration and dehumidification system.

Various features and advantages of the invention are set forth in the following claims.

I claim:

1. An integrated absorption refrigeration and dehumidification system comprising:
   a compressor including a first stage and a second stage;
   an absorber containing an absorption solution that is a mixture of a refrigerant and a secondary solution;
   an after-cooler including a first flow path to receive the absorption solution from the absorber and a second flow path to receive the first warm fluid, the first and second flow paths being thermally coupled such that the first warm fluid heats the absorption solution to separate a first portion of refrigerant from the absorption solution;
   an auxiliary heat exchanger separate from the after-cooler and including a third flow path to receive the absorption solution from the after-cooler and a fourth flow path to receive the second warm fluid, the third and fourth flow paths being thermally coupled such that the second warm fluid heats the absorption solution to separate a second portion of refrigerant from the absorption solution;
   a condenser positioned to receive the first portion of refrigerant and the second portion of refrigerant from the auxiliary heater and cool the refrigerant;
   an expansion valve positioned to receive the refrigerant from the condenser;
   an evaporator positioned to receive a cool refrigerant from the expansion valve and the first warm fluid from the after-cooler, the evaporator configured to cool the first warm fluid with the cool refrigerant to discharge a cool fluid; and
   a separator positioned to remove condensate from at least one of the first warm fluid from the after-cooler and the cool fluid from the evaporator, wherein the first warm fluid and the second warm fluid are compressed air from the compressor, and wherein compressed air from the first stage is the second warm fluid having a first stage pressure and compressed air from the second stage is the first warm fluid having a second stage pressure that is greater than the first stage pressure, the second warm fluid flowing to the second stage and being discharged from the second stage as the first warm fluid.

2. The integrated absorption refrigeration and dehumidification system of claim 1, further comprising a pump positioned between the absorber and the after-cooler to draw the absorption solution from the absorber and propel the absorption solution into the after-cooler.

3. The integrated absorption refrigeration and dehumidification system of claim 1, further comprising a control valve positioned between the auxiliary heat exchanger and the absorber to direct the secondary solution from the auxiliary heat exchanger to the absorber.

4. The integrated absorption refrigeration and dehumidification system of claim 1, wherein the separator is positioned to receive the first warm fluid from the after-cooler to remove condensate from the warm fluid, the system further comprising a second separator positioned to receive the cool fluid from the evaporator to remove condensate from the cool fluid.

5. The integrated absorption refrigeration and dehumidification system of claim 1, further comprising a recuperator including a first side and a second side in a heat exchange relationship, wherein the first warm fluid from the after-cooler passes through the first side and the cool fluid from the evaporator passes through the second side.

6. The integrated absorption refrigeration and dehumidification system of claim 1, wherein the compressor is an oil-flooded rotary screw compressor, wherein the compressed air is separated from hot oil with an oil separator, and wherein the hot oil is the second warm fluid that passes through the fourth flow path of the auxiliary heater to heat the absorption solution and cool the hot oil in the auxiliary heater.

7. The integrated absorption refrigeration and dehumidification system of claim 1, wherein the first warm fluid is compressed fuel for a microturbine engine.

* * * * *